March 25, 1930.  H. G. TRENCH  1,752,284
SPRING SHACKLE
Original Filed Jan. 18, 1926  2 Sheets-Sheet 1
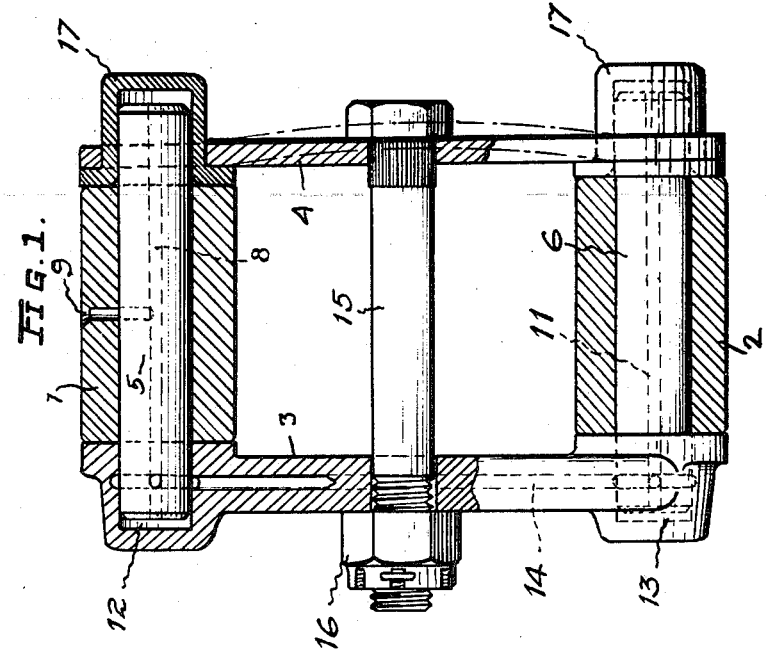
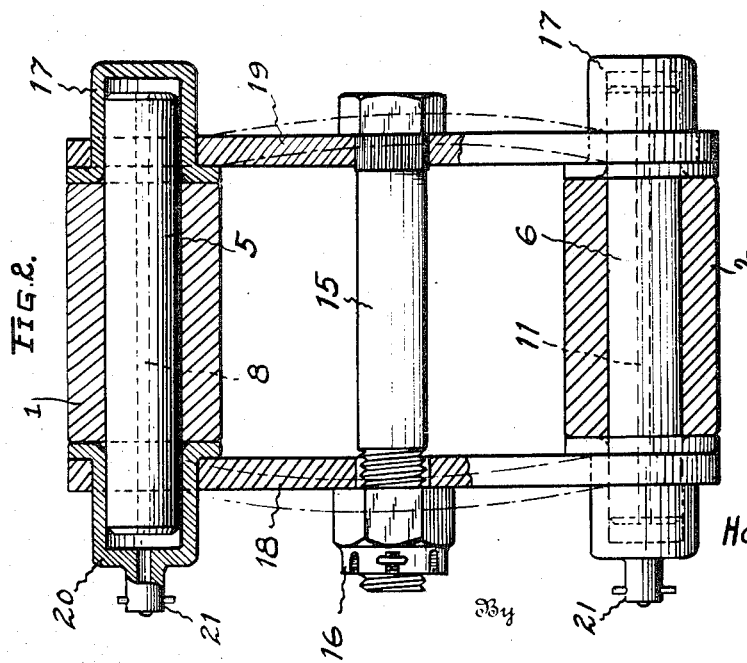
Inventor
Harry G. Trench
Evans & McCoy
Attorneys March 25, 1930.  H. G. TRENCH  1,752,284
SPRING SHACKLE
Original Filed Jan. 18, 1926  2 Sheets-Sheet 2
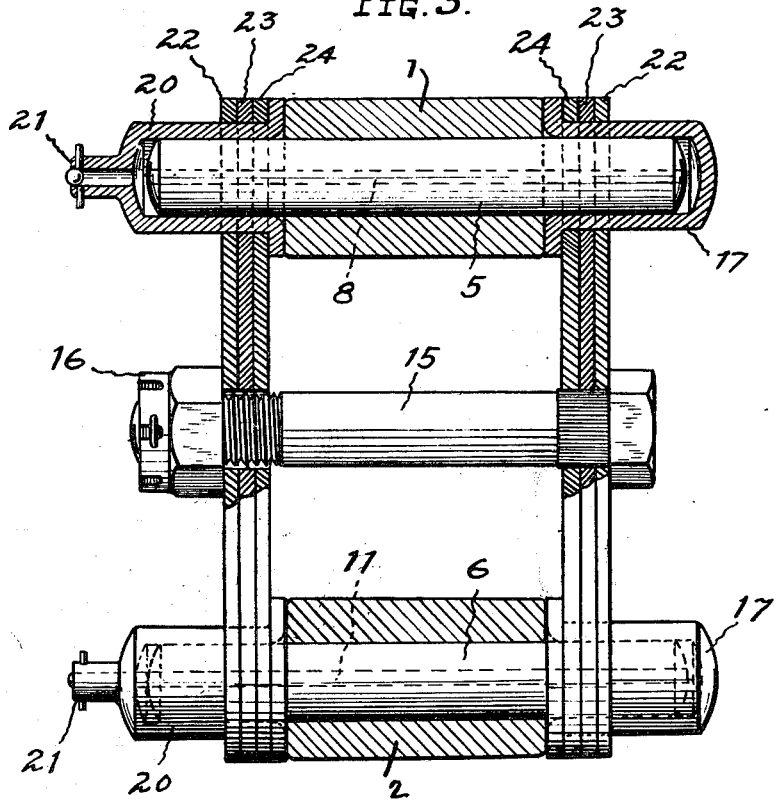
Inventor
Harry G. Trench
By Evans & McCoy
Attorneys Patented Mar. 25, 1930

1,752,284

UNITED STATES PATENT OFFICE

HARRY G. TRENCH, OF HARTFORD, CONNECTICUT, ASSIGNOR TO THE UNION TRUST COMPANY, OF CLEVELAND, OHIO, A CORPORATION OF OHIO

SPRING SHACKLE

Original application filed January 18, 1926, Serial No. 81,947. Divided and this application filed May 26, 1927. Serial No. 194,294.

This invention relates to shackles for vehicle springs, and more particularly to a form of shackle unit that is an improvement over the constructions described in my Patent No. 1,042,173 that issued on October 20, 1912. This application is a division of my copending application Serial No. 81,947 that was filed on January 18, 1926, and is entitled "Spring shackles".

Constructions of this character are employed for connecting vehicle springs with the vehicle chassis in such manner as to permit relative movement between the end of the spring and the vehicle frame. The shackle unit herein described is primarily adapted to permit movement of the end of the spring relative to the vehicle frame, both in a longitudinal and lateral direction, while yieldingly restraining such movement, and to dampen relative motion of the spring, in order to prevent rattling or slapping of the shackling mechanism during operation of the vehicle.

One of the objects of this invention is to provide an improved form of shackling unit embodying the characteristic advantages of my previously proposed shackling unit, which shall be more easily assembled and shall have a single adjusting mechanism for regulating the degree of pressure applied by the shackle plates to the head of the vehicle spring and to the portion of the frame that carries the shackling unit.

An additional object of my invention is to provide a mechanism that may be manufactured at less cost than the mechanism heretofore proposed.

A further object of my invention is to provide a shackle assembly that is secured in operative position by a single adjusting nut and that embodies resilient shackle plates.

An additional object of the invention is to provide a shackle unit embodying a resilient shackle plate that is adapted to be adequately lubricated from a central vehicle lubricating system.

Another object of the invention is to provide a shackle unit formed in general of pressed metal parts that is intended to be used without bushings in the vehicle spring head and frame support.

These and other objects will be apparent from a study of the accompanying drawings, wherein:

Figure 1 is a side elevational view, shown partially in section, of a form of the shackle unit for connecting a vehicle spring to the frame of a vehicle.

Fig. 2 is a side elevational view, shown partially in section, of a shackle unit embodying a pair of opposed flexible shackle plates and readily removable bearing cups; and Fig. 3 is a corresponding view of a modified form of the shackle shown in Fig. 2 employing a plurality of leaf springs as side members.

The shackle unit shown in the accompanying drawings is used to connect a vehicle frame portion 1 with one end of a vehicle supporting spring 2, the vehicle parts being broken away close to the shackle unit because they constitute no part of my present invention and serve only to illustrate the mounting of the shackle unit on any desired form of vehicle.

The shackle unit shown in Fig. 1 comprises, together with other elements, a pair of spaced shackle plates 3 and 4. Pintles 5 and 6, that are respectively carried by the frame 1 and the spring head 2, serve to connect the head of the spring 2 with the frame portion 1.

The pintle 5 that is mounted in the frame is preferably provided with a longitudinally extending oil duct 8 that communicates with any desired source of lubricant supply through duct 9. The corresponding pintle 6 is rigidly secured in the eye 2 of the spring and is also provided with a longitudinally extending lubricating channel 11.

The shackle plate 3 is preferably a melleable casting that has a suitable pintle receiving bearing pocket 12 formed in one end and a corresponding pocket 13 formed in the other end thereof. A longitudinally extending oil duct 14 connects these pockets for the supply of lubricant from the duct 9 through the ducts 8 and 14 to the duct 11 of the bottom pintle. The shackle plate 3 also has an aperture intermediate its ends for receiving the assembly bolt 15 that extends through a corresponding aperture in the other shackle plate and that is provided with a suitable castellated nut 16 that maintains the shackle in position.

The shackle plate 4 is preferably formed of a leaf spring that imposes the desired degree of pressure against the spring head and the frame. Each end of this shackle plate is apertured for receiving a bearing cup 17 that is preferably formed of pressed metal and that is adapted to take the wear resulting from the movement of the pintles relative to the shackle unit. Lubricant is conveyed to the bearing cups 17 from the channels 8 and 11. The degree of flexure obtained in the spring plate 4 is so arranged as to give the desired lateral pressure upon the spring head and the frame support. It is desired, however, that the spring plate be substantially flat in its ultimate adjusted position.

The bearing cups 17 are preferably of pressed metal having a bearing pocket that is just large enough to snugly fit over the end of the corresponding pintle to provide a bearing support therefor. Each of the bearing cups fits within the suitably formed aperture in the corresponding end of the spring plate 4 which serves as a shackle plate for one side of the unit.

The operation of a shackle plate of this character will be readily understood by those skilled in the art. In addition to avoiding costly bushings, this construction avoids the use of a supplemental spring for imposing pressure tending to hold the shackle plates against the spring head. It will also be noted that the pintle is entirely enclosed and that dust and other foreign material is excluded from the connections by the close fit of the bearing cups with the spring head.

The form of shackle shown in Fig. 2 embodies a pair of opposed leaf spring shackle plates 18 and 19 that engage bearing cups 17 and 20, one of which is carried by each end of the pintles. The bearing cups are supported in suitable apertures formed in the opposed shackle plates 18 and 19 in substantially the same manner as the bearing cups described in connection with Fig. 1.

The adjustment of the nut 16 of the assembly bolt 15 draws the central portions of the opposed leaf spring shackle plates 18 and 19 together a sufficient degree to bring the shackle plates to substantially the relative positions shown in solid outline. The dotted line shows the pre-formed curve or bow that is formed in each shackle plate in order to obtain the desired degree of pressure on the bearing cups. The end portions of the spring are slightly convex relative to the flanges of the bearing cups carried thereby in order to insure tight seating of the cup against the frame and vehicle spring support.

A lubricating nipple 21 is carried by each of the outside bearing cups 20 for the supply of lubricant to the bearing cup 17 carried by the remote end of the pintles 7 and 10 through the longitudinal lubricating channel extending through each pintle.

The shackle unit shown in Fig. 3 corresponds very closely to the shackle unit illustrated in Fig. 2 except that a plurality of leaf springs 22, 23 and 24 are substituted for the leaf spring shackle plates 18 and 19 shown in Fig. 2. This unit is intended for use with vehicles of larger size than the unit shown in Fig. 2 and, therefore, is made of more rugged construction.

The shackle units embodying opposed flexible shackle plates may be made much lighter in weight if the extended vehicle frame support underlies the head of the spring. Each of the proposed forms of shackle units is intended to be used both as suspension and as compression shackle units. It will also be evident to those skilled in the art that the same general structure employing the bearing cups could be used with non-resilient shackle plates if such were desired. If the lateral spring pressure is not desired in this construction, resilient means may be omitted.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A shackle unit for vehicle springs comprising a pair of spaced shackle plates, pintle bearing cups carried by said plates, a pintle for each end of the shackle plates, a transverse pressure applying assembly bolt connecting intermediate portions of said plates, one of said plates being relatively yielding in order to impose adjustable pressure between the end portions of said plates.

2. A shackle unit for use in connection with vehicle supporting springs comprising a shackle plate, an assembly bolt carried by an intermediate portion of said shackle plate, a second shackle plate having an aperture intermediate its ends through which said bolt extends, said plates having openings adjacent the ends thereof, replaceable pintle journal cups mounted in the openings in the end portions of said shackle plates, each cup having a flange overlying the inner face of the shackle plate in which it is mounted, pintles journaled in said cups carried in the end portions of said shackle plates, and a nut carried by the end of said assembly bolt adapted to maintain said shackle unit in assembled condition.

3. A vehicle spring shackle unit adapted to connect movably related vehicle parts, comprising a pair of shackle plates, a bolt adapted to draw portions of said respective plates toward each other, a pintle carried by each of the parts of the vehicle connected by the shackle, each of said shackle plates having an aperture formed at each end thereof, and pintle-receiving cups mounted in the apertured end portions of the shackle plates and clamped between said plates and vehicle parts.

4. A vehicle spring shackle unit adapted to connect movably related vehicle parts, comprising a pair of shackle plates each having openings adjacent the ends thereof, a bolt adapted to draw portions of said plates toward each other, a pintle receiving cup mounted in the opening in each end portion of each shackle plate, a pintle carried by each of the parts of the vehicle connected by the shackle, each of said cups being provided with an outstanding annular flange clamped between the shackle plate in which it is mounted and the pintle carrying vehicle part, each cup being adapted to securely seat against the vehicle part carrying the pintle to exclude dust and foreign material from the pintle and to provide a substantially closed lubricant receptacle for the supporting pintle.

5. A vehicle spring shackle comprising a pair of resilient yielding shackle plates, each of said shackle plates carrying a removable pintle-receiving cup at each end thereof, and being laterally flexible between the cup-holding portions and a transverse assembly bolt connecting the shackle plates intermediate the ends thereof to draw said shackle plates together upon the bearing cups and to maintain said unit in assembled position.

6. A vehicle spring shackle unit adapted to connect relatively movable vehicle parts, each of which carries a substantially rigidly mounted pintle, comprising a pair of leaf spring shackle plates curved outwardly in opposite directions when in unstressed condition, a pintle-receiving bearing cup carried by apertures formed in each of said shackle plates, each of the end portions of said shackle plates in contact with a bearing cup being slightly convex relative to said bearing cup to yieldingly maintain said bearing cup securely seated against the vehicle part carrying the corresponding pintle, each of said pintles having a longitudinally extending lubricant supply channel and one of the bearing cups having a pintle carrying a lubricant supply nipple.

In testimony whereof I affix my signature.
HARRY G. TRENCH.